(12) United States Patent
McElroy et al.

(10) Patent No.: US 8,078,531 B2
(45) Date of Patent: Dec. 13, 2011

(54) AUDITING OR DETERMINING REDUCTIONS TO CARD-ISSUER INTERCHANGE FEES

(75) Inventors: Alan Wayne McElroy, Bellevue, WA (US); Thomas P. Parrish, Spokane, WA (US); Kelly Birr, Bellevue, WA (US)

(73) Assignee: PE Systems, LLC, Spokane, WA (US)

( * ) Notice: Subject to any disclaimer, the term of this patent is extended or adjusted under 35 U.S.C. 154(b) by 525 days.

(21) Appl. No.: 11/740,143

(22) Filed: Apr. 25, 2007

(65) Prior Publication Data

US 2008/0270275 A1    Oct. 30, 2008

(51) Int. Cl.
*G06Q 40/00* (2006.01)

(52) U.S. Cl. ................. 705/39; 705/35; 705/40

(58) Field of Classification Search ............ 705/35, 705/39, 40
See application file for complete search history.

(56) References Cited

U.S. PATENT DOCUMENTS

| | | | |
|---|---|---|---|
| 6,006,205 A * | 12/1999 | Loeb et al. ............... 705/34 |
| 6,169,974 B1 | 1/2001 | Baumgartner et al. |
| 6,243,688 B1 | 6/2001 | Kalina |
| 6,999,943 B1 | 2/2006 | Johnston et al. |
| 7,499,887 B2 | 3/2009 | Boyle et al. |
| 7,603,312 B2 | 10/2009 | McElroy et al. |
| 7,624,068 B1 | 11/2009 | Heasley et al. |
| 7,627,521 B1 | 12/2009 | Sheehan et al. |
| 7,660,765 B1 | 2/2010 | Sheehan et al. |
| 7,676,409 B1 | 3/2010 | Farhan |
| 7,730,321 B2 | 6/2010 | Gasparini et al. |
| 7,752,134 B2 | 7/2010 | Spear |
| 8,019,680 B2 | 9/2011 | McElroy |
| 8,019,681 B2 | 9/2011 | McElroy |
| 8,024,268 B2 | 9/2011 | McElroy |
| 2002/0069176 A1 | 6/2002 | Newman |
| 2002/0138316 A1 * | 9/2002 | Katz et al. ............... 705/7 |
| 2002/0138428 A1 | 9/2002 | Spear |
| 2002/0170959 A1 | 11/2002 | Madani |
| 2002/0186249 A1 | 12/2002 | Lu |
| 2004/0088238 A1 * | 5/2004 | Gilson et al. ............ 705/35 |
| 2005/0027648 A1 | 2/2005 | Knowles et al. |
| 2005/0049963 A1 | 3/2005 | Barry |
| 2006/0116955 A1 | 6/2006 | Strayer et al. |
| 2006/0122932 A1 | 6/2006 | Birtwell et al. |
| 2006/0136315 A1 | 6/2006 | Muthiki et al. |
| 2006/0149671 A1 | 7/2006 | Nix et al. |
| 2006/0155672 A1 | 7/2006 | Lee et al. |
| 2007/0051794 A1 | 3/2007 | Glanz et al. |
| 2007/0208751 A1 | 9/2007 | Cowan et al. |
| 2008/0185429 A1 | 8/2008 | Saville |
| 2008/0270297 A1 | 10/2008 | McElroy |
| 2008/0270298 A1 | 10/2008 | McElroy |
| 2008/0306837 A1 | 12/2008 | Rae et al. |
| 2009/0281944 A1 | 11/2009 | Shakkarwar |
| 2009/0327124 A1 | 12/2009 | McElroy et al. |

(Continued)

OTHER PUBLICATIONS

Kantrow, Yvette D. "MasterCard to Raise Interchange Fee 11% Increase Said to Reflect Cost of Doing Business Series: 9." American Banker, (Aug. 21, 1990), p. 6.*

(Continued)

*Primary Examiner* — Elizabeth Rosen

(57) ABSTRACT

This document describes tools capable of auditing and/or determining reductions to card-issuer interchange fees charged for credit-card transactions. The tools may do so automatically and with user interaction for thousands or even millions of transactions.

4 Claims, 6 Drawing Sheets

U.S. PATENT DOCUMENTS

2010/0030634 A1 2/2010 McElroy et al.
2010/0094671 A1 4/2010 Oaks
2011/0010290 A1 1/2011 McElroy

OTHER PUBLICATIONS

Kantrow, Yvette D. "MasterCard Joins Visa in Hiking Bank Fees Series: 3." American Banker, (Aug. 6, 1992), p. 1.*
"Visa announces easing of retailer fees", *National Petroleum News, Chicago*, Proquest, vol. 97, Iss. 13,(Dec. 2005),12.
McElroy, Alan et al., "Statement of Actions Performed by Alan McElroy and/or PE Systems", (Apr. 24, 2006), 10 Pages.
"Non-Final Office Action", U.S. Appl. No. 11/740,172, (Jun. 20, 2008),10 Pages.
"Final Office Action", U.S. Appl. No. 11/740,172, (Feb. 2, 2009),14 Pages.
"Non-Final Office Action", U.S. Appl. No. 11/740,190, (Jun. 26, 2008),19 pages.
"Non-Final Office Action", U.S. Appl. No. 11/740,190, (Feb. 5, 2009),16 Pages.
"Non Final Office Action", U.S. Appl. No. 11/740,172, (Jun. 10, 2009), 15 pages.
"Merchant Discount Fees", *Abstract, Iss 833*, The Nilson Report, Los Angeles, (May 2005), 1 Page.
"Regulation-Interchange: New deals to cut interchange", Electronics Payments International. London.,(Jan. 2008),8 Pages.
"Mastercard cuts securecode rates for online merchants", *Abstract*, Cardline 2004, vol. 5 issue 45, pN.PAG.,(2004), 1 page.
"Notice of Allowance", U.S. Appl. No. 11/740,190 (Aug. 7, 2009),15 pages.
"Final Office Action", U.S. Appl. No. 11/740,172, (Jun. 9, 2010),16 pages.
"Final Office Action", U.S. Appl. No. 11/740,172, (Jan. 8, 2010),18 pages.
"Non-Final Office Action", U.S. Appl. No. 12/554,691, (Jan. 11, 2011),6 pages.
"Non-Final Office Action", U.S. Appl. No. 12/577,658, (Jan. 20, 2011),6 pages.
"Non-Final Office Action", U.S. Appl. No. 12/650,996, (Feb. 2, 2011),7 pages.
"Non-Final Office Action", U.S. Appl. No. 11/740,172, (Mar. 2, 2011),19 pages.
"A Real Opportunity for Merchants to Save Money on Credit Card Fees", *The Merchant's Guide*, Retrieved from: <http://www.themerchantsguide.com/benefits-savings-money.html>on May 26, 2008, 3 pages.
"Non-Final Office Action", U.S. Appl. No. 12/250,185, (Jun. 8, 2011), 26 pages.
"Notice of Allowance", U.S. Appl. No. 12/554,691, (May 12, 2011), 7 pages.
"Notice of Allowance", U.S. Appl. No. 12/577,658, (May 12, 2011), 7 pages.
"Notice of Allowance", U.S. Appl. No. 12/650,996, (Jun. 8, 2011), 12 pages.
Bosworth, Martin H., "MasterCard Offers Concessions in Interchange Fee Battle", Retrieved from: <http://www.consumeraffairs.com/printme.php?url=/news04/2006/09/mastercard_fees.html> on Jul. 16, 2007,(Sep. 6, 2006), 3 pages.
Breitkopf, David "Australia's Central Bank Wins a Legal Battle Over Fee Plan", American Banker. New York, N.Y. vol. 170, Issue 229,(Dec. 1, 2005), 3 pages.
Kanter, James "Visa Nears Settlement Over Fees—Credit-Card Company is Expected to Agree to Lower Merchant Rates", Wall Street Journal. Europe. Brussels,(Jul. 22, 2002), 2 pages.
Lindenmeyer, Isabelle "U.K. Says MasterCard Should Reduce Interchange", American Banker. New York, N.Y.: vol. 170, Issue 172,(Sep. 7, 2005), 3 pages.
Reid, Keith "Convenience Store", National Petroleum News, Chicago: Oct. 2005, vol. 97, Issue 11,(Oct. 2005), 3 pages.
Shearman, J. C., "Retailers Urge State Efforts on $36 Billion Credit Card Fee", *National Retail Federation: The Voice of Retail Worldwide*, Retrieved from: <http://www.nrf.com/moduels.php?name=News&sp_id=270&op=printfriendly&txt=Nation> on Jul. 16, 2007,(2006), 3 pages.

* cited by examiner

AUDITING OR DETERMINING REDUCTIONS TO CARD-ISSUER INTERCHANGE FEES

BACKGROUND

In many typical credit-card transactions, a consumer purchases a product or service from a merchant using a VISA®- or MasterCard®-branded credit card. To complete the transaction, the merchant receives an authorization from a third party, known as a "merchant processor," which is sponsored by a VISA®- or MasterCard®-member bank. Merchants typically select a merchant processor to install point-of-sale equipment, train the merchant's staff in the use of the equipment, access the credit-card network for authorizations, and process the merchant's credit-card transactions.

The merchant processor, through its sponsoring bank, reimburses the merchant for each transaction after deducting transaction fees retained by the merchant processor. Within these transaction fees are the merchant processor's processing fee, the interchange fees paid to the issuer of the credit card, and the assessment fees that are paid to the credit-card association. The merchant processor submits the net transaction into the card association's settlement network in order to be reimbursed by the issuing bank. The VISA® and MasterCard® associations are responsible for building, operating, maintaining, authorizing, and providing the information required for the member banks to settle their net transaction volume. Each association receives an assessment fee from both the merchant processor's bank and the issuer's bank for each credit-card transaction processed through their respective network. The issuer in turn bills the consumer the full amount of the original charge.

The interchange fees charged merchants by the card issuers can be quite expensive—currently billions of dollars a year worldwide. Unfortunately, the interchange categories used to determine these fees are difficult to understand and track, resulting in merchants paying much more than they should, either by not knowing how to change to less-expensive interchange categories or by being incorrectly assigned to expensive interchange categories.

These interchange categories are difficult to understand and track in part because there are so many different kinds. Some are based on the merchant's retail industry status, some on the type of card presented for payment, and some on the process used by the merchant to gain authorization for the transaction. For example, interchange categories (and thus the rate charged) may depend on whether the consumer's and card's data is processed electronically from the magnetic strip on the back of the card, manually by the merchant based on the information set forth on the card, or manually by the merchant based on information provided by the consumer over the telephone. In short, the number and complexity of these categories make it difficult for a merchant to adequately track or reduce their interchange-category fees.

The effect of these interchange categories is also difficult to track because of the sheer number of transactions received by merchants; some merchants receive hundreds of thousands of transactions a month. Merchants simply do not have the extraordinary manpower or expertise often needed to audit these transactions or figure out how to change transactions from an expensive category to a less-expensive category.

Further still, merchant processors—the companies that have good information about categories and fees—often have no incentive to help merchants track and reduce these fees; most merchant processors make no more money by providing details about these complexities than not doing so.

SUMMARY

This document describes tools capable of auditing and/or determining reductions to card-issuer interchange fees charged for credit-card transactions. The tools may do so automatically and without user interaction for thousands or even millions of transactions.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Overview

The following document describes tools capable of auditing and/or determining reductions to card-issuer interchange fees charged for credit-card transactions. To audit these fees, the tools may receive data indicating interchange categories assigned to various transactions and determine—based on published merchant-status parameters for the assigned categories and a particular merchant's status—that the assigned interchange categories are or are not correct. The tools may also track reductions to these fees for a client, including by building a baseline rate for the client over a period of time and then adjusting that rate to reflect interchange rate changes. After informing the client of ways in which to reduce their interchange fees, the tools may automatically track credit-card transaction data to determine rate reductions and savings for ongoing billing cycles.

An environment in which the tools may enable these and other actions is set forth below in a section entitled Example Operating Environment. This section is followed by Storing Credit-Card Transaction Data, which describes one particular example in which the tools act to enable an interchange module to receive credit-card transaction data and perform other actions for a national bookstore chain. The next section, entitled Building and Adjusting Baseline Interchange Rates, continues the bookstore example in the context of building and adjusting a baseline interchange rate for the national bookstore chain. The following section continues the bookstore example and determines a savings between an adjusted baseline interchange rate and a current rate; it is entitled Determining Card-Issuer Interchange-Fee Savings. The next section, entitled Auditing Interchange Categories, continues the example but from the Storing section, and describes ways in which the tools audit interchange categories assigned to credit-card transactions. A final section describes various other embodiments and manners in which the tools may act and is entitled Other Embodiments of the Tools. This overview, including these section titles and summaries, is provided for the reader's convenience and is not intended to limit the scope of the claims or the entitled sections.

Example Operating Environment

Before describing the tools in detail, the following discussion of an example operating environment is provided to assist the reader in understanding some ways in which various inventive aspects of the tools may be employed. The environment described below constitutes but one example and is not intended to limit application of the tools to any one particular operating environment. Other environments may be used without departing from the spirit and scope of the claimed subject matter.

Figure 1:
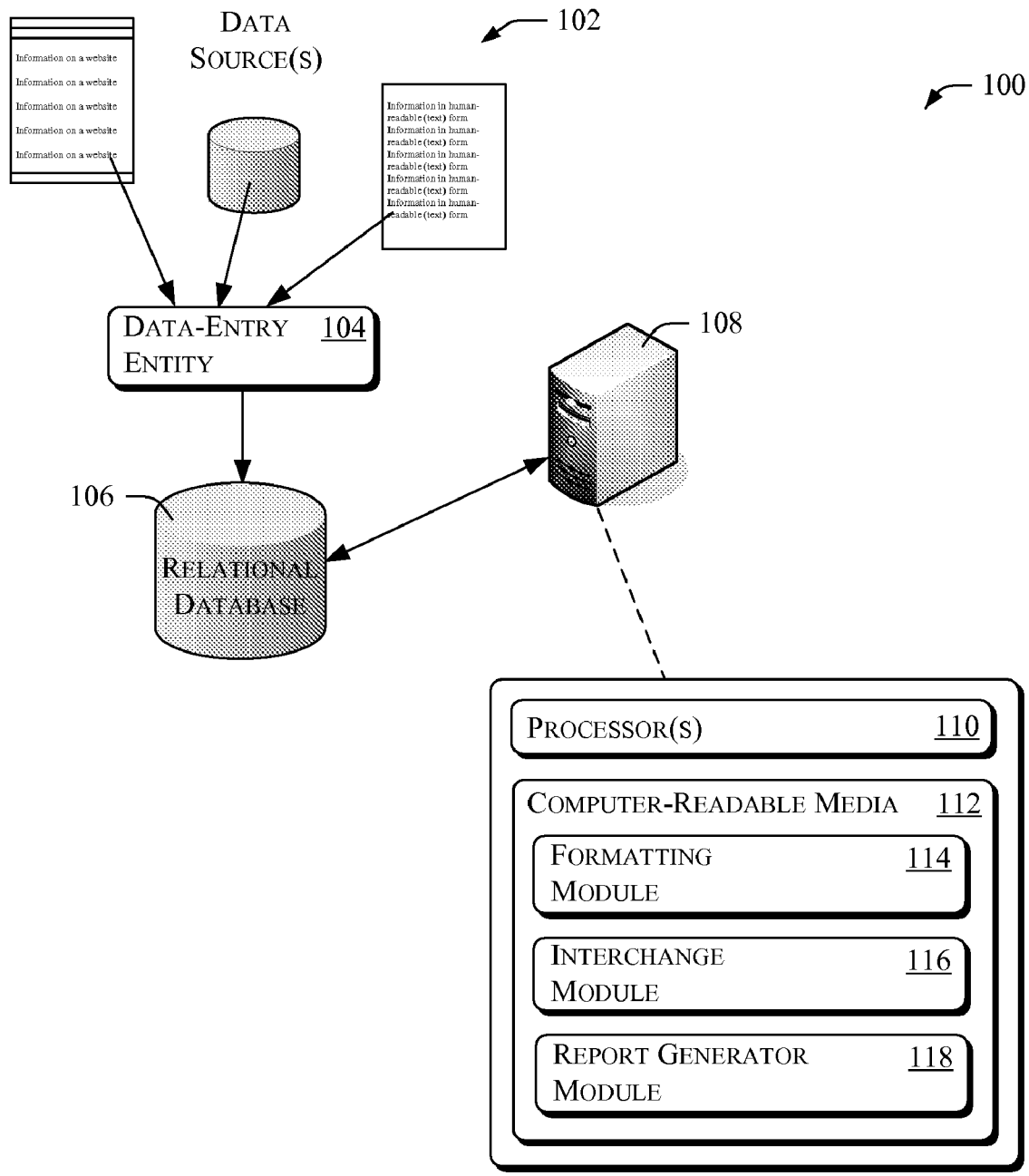
FIG. 1 illustrates an example operating environment in which various embodiments of the tools may operate.

FIG. 1 illustrates one such operating environment generally at 100 having data sources 102, a data-entry entity 104, a relational database 106, and a computing device 108. Communications between these entities are shown with arrows.

The data sources may include text-formatted documents easily readable by humans (e.g., paper), websites, or accessible databases, to name a few. The data-entry entity is responsible for retrieving information from the data sources and storing it in the relational database. This entity may include a person reading information from a paper document or website and typing the information into an application through which information is stored in intermediate memory or directly into the relational database, an application using Application Program Interfaces (APIs) to access API-accessible databases or applications and store information, or a Bot (an Internet-searching data gatherer) capable of gleaning information from websites and other data sources over the Internet. This entity may store information automatically and/or without user interaction in many cases, such as when it includes an application using APIs or a Bot.

The relational database includes one or more databases in which data may be stored and from which data may be extracted, such as a SQL™, Oracle™, or IBM™ DB2 relational database.

The computing device includes one or more processor(s) 110 and computer-readable media 112. The computing device is shown with a server icon, though it may comprise one or multiple computing devices of various types. The processors are capable of accessing and/or executing the computer-readable media.

The computer-readable media includes or has access to a formatting module 114, an interchange module 116, and a report generator module 118. In many cases credit-card transaction data is provided in a format or formats that are not easily readable by the interchange module or are not consistent. In these cases the formatting module may transform the information into one, easily-machine-usable format, often prior to loading it into the relational database. In one example case described in greater detail below, the formatting module includes an executable Extract, Transform, and Load (ETL) package. This ETL package may extract human-readable, text-formatted (e.g., pre-transformed) credit-card transaction data of one or multiple formats, transform this data into a format easily-usable by the interchange module, and load it into the rational database in a standardized format that may be used for computation.

The interchange module is capable of auditing and/or tracking reductions to interchange fees charged to merchants incident to those merchants accepting payments with credit cards. Note that the term "credit" includes credit, debit, and other accounting systems so long as they are processed by a credit or debit association (e.g., VISA® and MasterCard®). Also note that the term "card" applies to any medium or manner in which sales or purchases may be electronically transacted, such as a card having a magnetic strip, a card having circuitry, a credit account not having any physical element, or a key-faub that electromagnetically identifies an account. Ways in which the interchange module may audit and/or track fee reductions are developed in greater detail below.

The report generator module is capable of receiving information from the interchange module and providing reports on this information in human or computer-readable formats.

Storing Credit-Card Transaction Data

This section describes one particular example in which the tools act to store credit-card transaction data and enable the interchange module to receive this data. This example is an implementation of the tools but is not intended to limit the scope of the tools or the claimed embodiments.

The credit-card transaction data that the tools enable the interchange module to receive includes information about credit-card transactions (e.g., customers purchasing a product or service from a merchant using a credit card). This credit-card transaction data may include, for each purchase or groups of purchases, the purchase price, the date of the purchase or date that the purchase was batched by the merchant, a card-issuer interchange category, fee, or rate for the purchase, and through which credit-card association's network the purchase was made (e.g., VISA® or MasterCard®). The data may also indicate each purchase and its interchange category or groups of purchases by their interchange category, such as those categorized as VISA® Business Select, VISA® Business Standard, VISA® Standard, VISA®, RTL CK DB, VISA® CPS Retail, VISA® Credit Consumer Card, VISA® Credit Commercial Card, VISA® EIRF DB, VISA® Standard DB, VISA® CV-CN SR DB, VISA® Dues and Assessments, MasterCard® Standard, MasterCard® Merit, MasterCard® Key Entered, MasterCard® Corporate Data RTI, MasterCard® Standard DB, MasterCard® Key Entered DB, MasterCard® Merit 3 DB, MasterCard® Cons DB RF 3, MasterCard® Cons CR RF 4, MasterCard® Corporate CR RF 3, and MasterCard® Dues and Assessments, to name a few.

Parameters used to determine the category may also be included in the credit-card transaction data, such as a transaction's merchant's status parameters: business sector; area of operation; and taxable or non-taxable status, and parameters specific to the transaction, such as: having or not having the credit card present at the time of purchase; having the purchase made over the Internet or a telephone; having an address for the customer included with the transaction; and having a signature of the customer.

Figure 2:
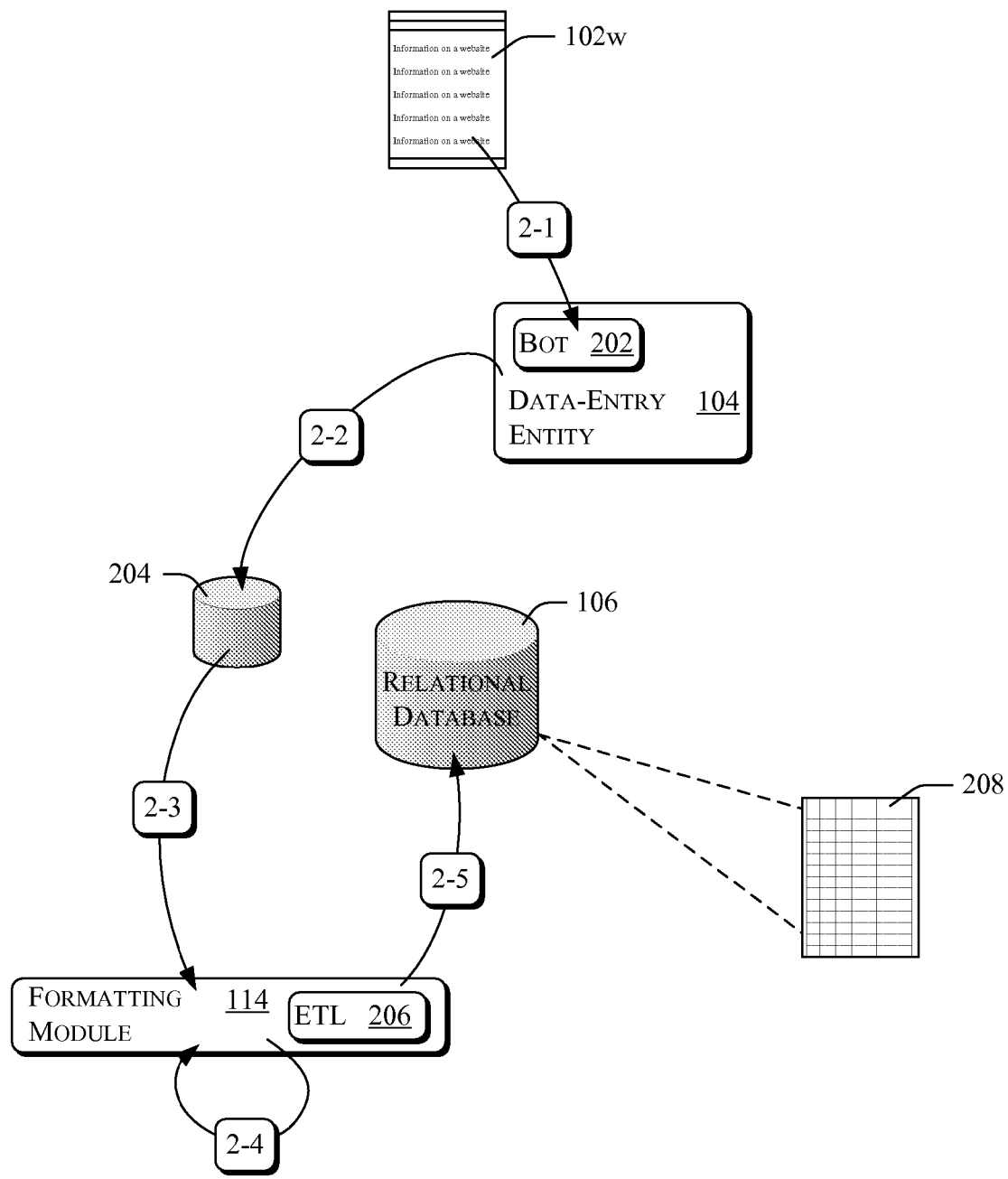
FIG. 2 illustrates an example flow diagram in which the tools act to enable the interchange module to receive credit-card transaction data and other information.

Having described the credit-card transaction data in some detail, the example turns to FIG. 2. FIG. 2 shows actions and interactions of and between elements of operating environment 100 of FIG. 1, as well as some results of these actions and interactions.

At arrow 2-1 in FIG. 2, a Bot 202 included in data-entry entity 104 gleans credit-card transaction data from a merchant processor's website 102w. Merchant processors often present credit-card transaction data to merchants on a website in a human-readable text format. Note that the Bot may glean credit-card transaction data for many if not thousands of merchants automatically and without user interaction through merchant-processors websites. In this example the data-entry entity gleans credit-card transaction data for all merchants associated with a particular client—here a national bookstore chain. A client may have one merchant or may have hundreds or thousands, depending on the size of the business.

The example national bookstore chain is assumed to have, for each bookstore, a merchant at its coffee shop, merchants at its check-out line, and a merchant at its service counter. This national bookstore also has merchants accessible through the Internet for website purchases. Assume that the national bookstore has 200 stores and 2,000 merchants. Each of the merchants may have hundreds or thousands of credit-card transaction per billing period, amounting to 800,000 to 8,000,000 credit-card transactions per billing period (e.g., a calendar month). As this number suggests, it is difficult if not impossible for clients to keep track of all credit-card transactions in a billing period by reading merchant-processor statements on websites, on paper, or in human-readable text formats.

Consider the following example merchant-processor statement in human-readable text format. This processor statement is presented at the merchant processor's website 102w of FIG. 2. This statement includes credit-card transaction data for just one merchant during just one billing cycle.

May 31, 2005 1923 192320009
Merchant Processor
Merchant Processor's Address
Merchant Processor's Identification Number
Merchant
Merchant's Address
Mercahant's Identification Number: 932734932

PLAN SUMMARY

| PL | #SALES | $SALES | #CREDITS | $CREDITS | NET SALES | AVG TKT | DISC P/I | % | DISCOUNT DUE |
|---|---|---|---|---|---|---|---|---|---|
| V | 997 | 52,203.43 | 26 | 925.68 | 51,277.75 | 52.36 | .130 | .000 | 129.61 |
| M | 1574 | 77,488.14 | 40 | 1,180.06 | 76,308.08 | 49.23 | .130 | .000 | 204.62 |
| DS | 298 | 16,210.99 | 17 | 583.77 | 15,672.22 | 54.40 | .000 | .000 | .00 |
| ** | 2869 | 145,902.56 | 83 | 2,689.51 | 143,213.05 | 50.85 | | | 334.23 |

| DAY | REF NO. | * | PL | #SALES | $SALES | $CREDITS | DIS.PD | NET DEPOSIT |
|---|---|---|---|---|---|---|---|---|
| 01 | 52106000034 | D | T | 76 | 3,695.36 | 136.59 | .00 | 3,558.77 |
| 02 | 52106100038 | D | T | 73 | 4,028.78 | 39.33 | .00 | 3,989.45 |
| 03 | 52106200038 | D | T | 64 | 4,709.22 | .00 | .00 | 4,709.22 |
| 04 | 52106300037 | D | T | 95 | 4,131.47 | 87.09 | .00 | 4,044.38 |
| 06 | 52106400038 | D | T | 97 | 4,440.53 | 119.75 | .00 | 4,320.78 |
| 06 | 52106500036 | D | T | 149 | 9,125.75 | 84.94 | .00 | 9,040.81 |
| 07 | 52106600038 | D | T | 63 | 2,500.94 | 57.31 | .00 | 2,443.63 |
| 08 | 52106700037 | D | T | 92 | 4,395.07 | 150.35 | .00 | 4,244.72 |
| 09 | 52106800038 | D | T | 77 | 3,466.22 | 54.15 | .00 | 3,412.07 |
| 10 | 52106900038 | D | T | 78 | 3,445.58 | 18.05 | .00 | 3,427.53 |
| 11 | 52107000037 | D | T | 87 | 3,442.54 | 65.83 | .00 | 3,376.71 |
| 13 | 52107100037 | D | T | 87 | 4,151.55 | 358.95 | .00 | 3,792.60 |
| 13 | 52107200037 | D | T | 117 | 6,766.41 | 5.29 | .00 | 6,761.12 |
| 14 | 52107300036 | D | T | 88 | 4,406.70 | 63.72 | .00 | 4,342.98 |
| 15 | 52107400038 | D | T | 76 | 2,070.91 | 35.54 | .00 | 2,035.37 |
| 16 | 52107500038 | D | T | 94 | 4,606.75 | 62.78 | .00 | 4,543.97 |
| 17 | 52107600036 | D | T | 90 | 3,568.66 | 7.43 | .00 | 3,561.23 |
| 18 | 52107700040 | D | T | 122 | 5,764.02 | 174.37 | .00 | 5,589.65 |
| 20 | 52107800038 | D | T | 119 | 5,803.97 | 44.70 | .00 | 5,759.27 |
| 21 | 52108000039 | D | T | 230 | 15,854.65 | 32.97 | .00 | 15,821.68 |
| 22 | 52108100040 | D | T | 111 | 5,544.80 | 232.06 | .00 | 5,312.74 |
| 23 | 52108200037 | D | T | 93 | 4,199.12 | 141.67 | .00 | 4,057.45 |
| 24 | 52108300040 | D | T | 76 | 2,660.72 | 128.79 | .00 | 2,531.93 |
| 25 | 52108400038 | D | T | 71 | 2,764.74 | 12.74 | .00 | 2,752.00 |
| 27 | 52108500040 | D | T | 112 | 7,216.82 | 39.55 | .00 | 7,177.27 |
| 27 | 52108600038 | D | T | 134 | 7,511.06 | 219.85 | .00 | 7,291.21 |
| 29 | 52108800040 | D | T | 107 | 5,101.36 | 134.45 | .00 | 4,966.91 |
| 31 | 52109000040 | D | T | 191 | 10,528.86 | 181.26 | .00 | 10,347.60 |
| DEPOSIT TOTALS | | | | 2,869 | 145,902.56 | 2,689.51 | .00 | 143,213.05 |

AMOUNT DEDUCTED FROM ACCOUNT 2,725.61
FEES

| NUMBER | AMOUNT | DESCRIPTION | TOTAL |
|---|---|---|---|
| | | SUPPORT PACKAGE | 5.95 |
| 02 | 14.00 | TERMINAL FEE | 28.00 |
| 10 | 586.95 | VISA ® STANDARD (2.63% × SALES + $.10 × ITEMS) | 16.44 |
| 350 | 12,452.24 | VISA ® RTL CK DB (1.05% XSALES + $.10 × ITEMS) | 183.25 |
| 461 | 27,404.65 | VISA ® CPS RETAIL (1.54% × SALES + $.10 × ITEMS) | 468.13 |
| 57 | 3,431.71 | VISA ® EIRF (2.14% × SALES + $.10 × ITEMS) | 79.14 |

-continued

| | | | |
|---|---|---|---|
| 16- | 662.12- | VISA ® CREDIT CONSUMER CARD @ 1.67% | 11.06- |
| 01- | 6.37- | VISA ® CREDIT COMMERCIAL CARD @ 2.24% | .14- |
| 47 | 1,716.92 | VISA ® EIRF DB (1.75% × SALES + $.1.75% + $.20 × ITEMS) | 39.45 |
| 02 | 92.90 | VISA ® STANDARD DB(1.90% × SALES + $.25 × ITEMS) | 2.27 |
| 09- | 257.19- | VISA ® CV-CNSR DB (1.31% × SALES) | 3.37- |
| | 52,203.43 | VISA ® DUES AND ASSESSMENTS (.0925% × SALES) | 48.29 |
| 10 | 1,577.69 | MC STANDARD (2.70% × SALES + $.10 × ITEMS) | 43.60 |
| 522 | 32,284.36 | MC MERIT 3 (1.54% × SALES + $.10 × ITEMS) | 549.38 |
| 06 | 1,579.45 | MC KEY ENTERED (1.90% × SALES + $.10 × ITEMS) | 30.61 |
| 81 | 3,821.95 | MC CORP DATA RTI(2.65% × SALES + $.10 × ITEMS) | 109.38 |
| 16 | 604.03 | MC STANDARD DB (1.90% × SALES + $.25 × ITEMS) | 15.48 |
| 10 | 203.57 | MC KEY ENTER DB (1.64% × SALES + $.16 × ITEMS) | 4.94 |
| 929 | 37,417.09 | MC MERIT 3 DB (1.05% × SALES + $.15 × ITEMS) | 532.23 |
| 19- | 371.74- | MC CONS DB RF 3 @ 1.40% | 5.20- |
| 19- | 668.64- | MC CONS CR RF 4 @ 1.77% | 11.83- |
| 02- | 139.68- | MC CORP CR RF 3 @ 2.15% | 3.00- |
| | 77,488.14 | MC DUES AND ASSESSMENTS(.095% × SALES) | 73.61 |
| 65 | 6,311.88 | VISA ® BUS ELECT (2.20% × SALES + $.10 × ITEMS) | 145.36 |
| 05 | 206.18 | VISA ® BUS STD (2.70% × SALES + $.10 × ITEMS) | 6.07 |
| 296 | | DISCOVER AUTHORIZATIONS @ 15 CENTS | 44.40 |
| | | OTHER FEES DUE | 2,391.38 |

| | | |
|---|---|---|
| | DISCOUNT DUE | 334.23 |
| | OTHER FEES DUE | 2,391.38 |
| | AMOUNT DEDUCTED | 2,725.61 |

Legend
CARD PLAN CODES
VD—VISA ® DEBIT CARD
MB—MASTERCARD ® BUS. CARD
P3—PRIVATE LABEL PLAN 3
VL—VISA ® LARGE TICKET
JB—JCB
AM—AMERICAN EXPRESS
VB—VISA ® BUSINESS CARD
P1—PRIVATE LABEL PLAN 1
VA—VISA ® CASH
ML—MCS LARGE TICKET
DC—DINERS CLUB CARD
V—VISA ®
M—MASTERCARD ®
P2—PRIVATE LABEL PLAN 2
MA—MASTERCARD ® CASH
DB—DEBIT CARD
DS—DISCOVER
TRANSACTION PLAN CODES
V—VISA ®
L—LARGE TICKET
2—PLAN TWO
D—DEBIT
M—MASTERCARD ®
T—ALL PLANS
3—PLAN THREE
B—BUSINESS CARD
P—PRIVATE LABEL
1—PLAN ONE
A—CASH ADVANCE
TRANSACTION TYPE CODES
D—DEPOSIT
B—CHARGEBACK REVERSAL
C—CHARGEBACK
A—ADJUSTMENT At arrow 2-2, the data-entry entity stores the credit-card transaction data into intermediate storage 204 in the human-readable text format. The data stored in this example is human-readable text and likely differs from a format of some other merchant or client or is not an easily-machine-usable format. The tools proceed to arrow 2-3 to address this issue.

At arrow 2-3, formatting module 114 extracts the text-format credit-card transaction data for the thousands of merchants of the national bookstore chain using an Extract portion of an Extract, Transform, and Load (ETL) process. The tools execute a formatting ETL package 206, shown included in the formatting module of FIG. 2, to perform this ETL process. The formatting module differentiates between merchants of the national bookstore chain and other merchants based on merchant identifiers associated with the bookstore. These merchant identifiers are stored in table 208 in the relational database.

At arrow 2-4, the formatting module transforms the text-format credit card transaction data into an easily-machine-usable format for the thousands of merchants and uses a Transform portion of the ETL process. This transformation is shown with arrow 2-4.

At arrow 2-5, the formatting module loads the credit-card transaction data in the easily-machine-usable format into the relational database. It loads the credit-card transaction data in this easily-machine-usable format for the thousands of merchants using a Load portion of the ETL process. For the one example merchant above, the formatting module stores its data into table 208 of the rational database. The formatting module also associates the merchant identifiers (here the "Merchant's Identification Number") in table 208 with the appropriate credit-card transaction data. The formatting module may also or instead associate the credit-card transaction data with internal database record numbers.

At this point in the process, credit-card transaction data is stored in the relational database in a format that is easily usable and consistent. By so doing, interchange module 116 may use the data to audit, track fee reductions, or otherwise use information about interchange categories for credit-card transactions. Examples of how the interchange module may do so are described below and include building a baseline card-issuer interchange rate and adjusting that rate, auditing card-issuer interchange fees, and tracking reductions in those fees.

Building and Adjusting Baseline Interchange Rates

This section continues the above example in the context of credit-card transaction data being made available to interchange module 116 to build and adjust a baseline interchange rate for the above-described national bookstore chain. In later sections the transaction data made available to the interchange module will be used for other purposes, such as monthly auditing or determining savings.

In this section the tools start by building, automatically and without user interaction, a baseline interchange rate for the bookstore client based on a twelve-month history of credit-card transaction data for the bookstore's 2,000 merchants. The interchange module is enabled to extract this historical data by the tools performing the actions of FIG. 2 twelve times for each of the 2,000 merchants, i.e., for 24,000 merchant-processor statements.

The credit-card transaction data received is in an easily-machine-usable form and includes card-issuer interchange fees, dollar volumes, and numbers of transactions to which card-issuer interchange categories are assigned by a merchant processor. This data is for each merchant and for each billing cycle of the historic period, i.e., twelve historic merchant-processor statements of each particular merchant for all of the bookstore's merchants over the historical twelve-month period.

Figure 3:
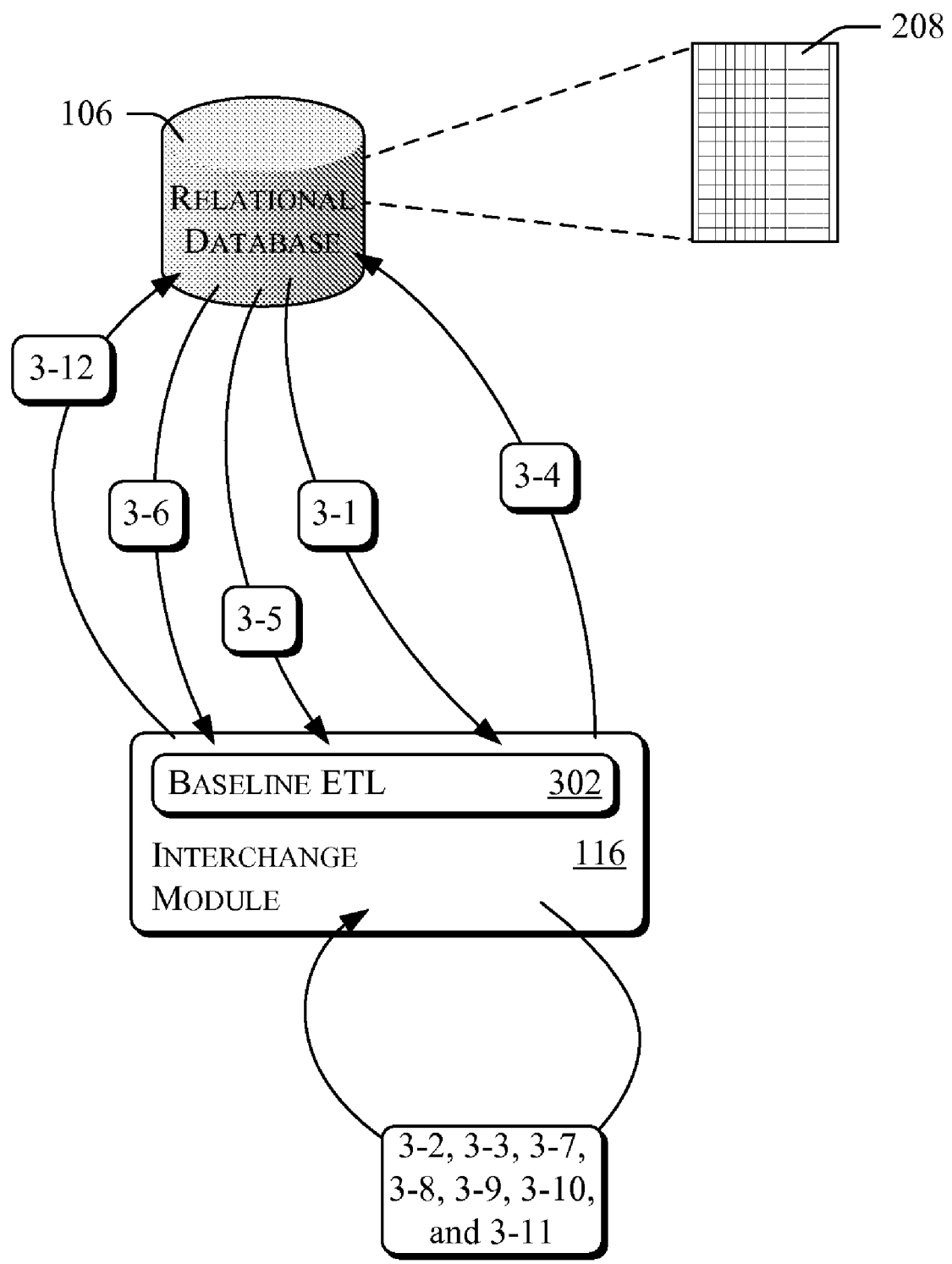
FIG. 3 illustrates an example flow diagram in which the tools build and adjust a baseline interchange rate.

Specially, at arrow 3-1 in FIG. 3, interchange module 116 extracts card-issuer interchange fees and dollar volumes on which the fees were assessed for all of the bookstore's 2,000 merchants over the last twelve billing cycles. The interchange module uses each merchant's identifier (e.g., "932734932") and each billing cycle's end date (e.g., May 31, 2005) to find this information in relational database 106 (e.g., portions of table 208 for one merchant at one billing cycle).

At arrow 3-2, the interchange module adds up all the fees and dollar volumes for each merchant over the twelve-month period. The interchange module then does this again and again for every merchant and then adds these together. By so doing, the interchange module determines the client's total fees and dollar volume on which the fees were based.

At arrow 3-3, the interchange module divides the total fees by this dollar volume to provide a baseline card-issuer interchange rate for the historical twelve-month period for the bookstore.

At arrow 3-4, the interchange module loads the baseline card-issuer interchange rate into relational database 106. The interchange module performs the actions of arrows 3-1 to 3-4 using baseline ETL package 302, shown included in interchange module 116 in FIG. 3.

After building the baseline, the tools proceed to adjust the baseline in the following example manner.

At arrow 3-5, the interchange module determines the dollar volume on which each card-issuer interchange category was assigned for all credit-card transactions for all of the bookstore's 2,000 merchants during the historic period. The categories assigned may be tracked as part of arrows 3-1 to 3-3 or separately, as is done here. Here the interchange module extracts, from the historic credit-card transaction data for the bookstore's merchants, the interchange categories assigned, the dollar volumes, and the number of transactions for each of the interchange categories. Consider a portion of the example merchant-processor statement provided above:

| FEES NUMBER | AMOUNT | DESCRIPTION | TOTAL |
|---|---|---|---|
| | | SUPPORT PACKAGE | 5.95 |
| 02 | 14.00 | TERMINAL FEE | 28.00 |
| 10 | 586.95 | VISA ® STANDARD (2.63% × SALES + $.10 × ITEMS) | 16.44 |
| 350 | 12,452.24- | VISA ® RTL CK DB (1.05% × SALES + $.15 × ITEMS) | 183.25 |
| 461 | 27,404.65 | VISA ® CPS RETAIL (1.54% × SALES + $.10 × ITEMS) | 468.13 |
| 57 | 3,431.71 | VISA ® EIRF (2.14% × SALES + $.10 × ITEMS) | 79.14 |
| 16- | 662.12- | VISA ® CREDIT CONSUMER CARD @ 1.67% | 11.06- |
| 01- | 6.37- | VISA ® CREDIT COMMERCIAL CARD @ 2.24% | .14- |
| 47 | 1,716.92 | VISA ® EIRF DB (1.75% × SALES + $.20 × ITEMS) | 39.45 |
| 02 | 92.90 | VISA ® STANDARD DB (1.90% × SALES + $.25 × ITEMS) | 2.27 |
| 09- | 257.19- | VISA ® CV-CNSR DB (1.31% × SALES) | 3.37- |
| | 52,203.43 | VISA ® DUES AND ASSESSMENTS (.0925% × SALES) | 48.29 |
| 10 | 1,577.69 | MC STANDARD (2.70% × SALES + $.10 × ITEMS) | 43.60 |
| 522 | 32,284.36 | MC MERIT 3 (1.54% × SALES + $.10 × ITEMS) | 549.38 |
| 06 | 1,579.45 | MC KEY ENTERED (1.90% × SALES + $.10 × ITEMS) | 30.61 |
| 81 | 3,821.95 | MC CORP DATA RT1 (2.65% × SALES + $.10 × ITEMS) | 109.38 |
| 16 | 604.03 | MC STANDARD DB (1.90% × SALES + $.25 × ITEMS) | 15.48 |
| 10 | 203.57 | MC KEY ENTER DB (1.64% × SALES + $.16 × ITEMS) | 4.94 |
| 929 | 37,417.09 | MC MERIT 3 DB (1.05% × SALES + $.15 × ITEMS) | 532.23 |
| 19- | 371.74- | MC CONS DB RF 3 @1.40% | 5.20- |
| 19- | 668.64- | MC CONS CR RF 4 @1.77% | 11.83- |
| 02- | 139.68- | MC CORP CR RF 3 @2.15% | 3.00- |
| | 77,488.14 | MC DUES AND ASSESSMENTS (.095% × SALES) | 73.61 |
| 65 | 6,311.88 | VISA ® BUS ELECT (2.20% × SALES + $.10× ITEMS) | 145.36 |
| 05 | 206.18 | VISA ® BUS STD (2.70% × SALES + $.10× ITEMS) | 6.07 |
| 296 | | DISCOVER AUTHORIZATIONS @ 15 CENTS | 44.40 |
| | | OTHER FEES DUE | 2,391.38 |

In this case the interchange module determines that 461 credit-card transactions totaling $27,404.65 were assigned a "VISA® CPS RETAIL" card-issuer interchange category for one merchant for one billing cycle. The interchange module does this over and over for each category and each merchant and each billing cycle in the historic period. Assume, for example, that the interchange module determines that 800,000 transactions totaling $50,000,000 were assigned a "VISA® CPS RETAIL" category for the bookstore during the twelve-month history.

At arrow 3-6, the interchange module receives current card-issuer interchange rates for each of the categories assigned to a credit-card transaction. The module receives this by extracting it from the relational database into which it was stored by data-entry entity 104 either automatically or by manual user entry.

At arrow 3-7, the interchange module determines if any of the assigned category's rates have changed. Assume that the "VISA® CPS RETAIL" rate, which during the historic period was 1.54% of each sale plus $0.10 per sale, is now 1.55% of each sale plus $0.11 per sale. For simplicity, assume that no other category's rate has changed since or during the twelve-month historical period (which is unlikely). The interchange module determines that the "VISA® CPS RETAIL" rate changed based on its old rate (which was found in the credit-card transaction data in the merchant-processor statement but could be found in other ways) compared to the new rate.

At arrow 3-8, the interchange module determines the rate change—here 0.01% of each sale and $0.01 per sale.

At arrow 3-9, the interchange module determines a fee difference over the historical period sufficient to reflect the rate change. This rate change reflects what the baseline rate would have been had the new rate been charged throughout the historic period. The interchange module multiplies the rate change by the dollar volume and number of transactions.

The "VISA® CPS RETAIL" category had 800,000 transactions totaling $50,000,000, so the fee difference is:

Fee difference=0.0001×$50,000,000+$0.01×800,000=$13,000

At arrow 3-10, the interchange module adds this fee to the total fee for all credit-card transactions for the bookstore during the historical period. Here assume the total fee was $15,000,000. Thus, the adjusted fee over the baseline historical period would be $15,013,000.

At arrow 3-11, the interchange module divides the adjusted fee of $15,013,000 by the total dollar volume for the bookstore over the historical period (e.g., $750,000,000). This provides an adjusted baseline card-issuer interchange rate. If the fee based on the adjusted rate was $15,000,000 divided by $750,000,000, and thus 2.00%, the adjusted baseline rate is 2.00173333%.

At arrow 3-12, the interchange module stores the adjusted baseline rate in relational database 106 of FIG. 3. The interchange module may perform the actions of arrows 3-5 to 3-11 using a Transform portion of an ETL process by executing baseline ETL package 302 and arrow 3-12 using a Load portion of this ETL process.

At this point various potential fee savings may be proposed, such as ways to upgrade some types of future transactions from unfavorable (expensive) categories to more-favorable (less-expensive) categories. VISA® EIRF DB, for example, which is currently at a 2.14% fee, may be upgraded to VISA CPS Retail (currently 1.54%) by changing order-intake procedures. The bookstore can changes its policies to upgrade or otherwise avoid high-fee interchange categories being assigned to credit-card transactions. The tools determine fees saved based on these and other changes by comparing the adjusted baseline card-issuer interchange rate for the client with a current rate being assessed. One way in which to find these savings is described in the following section.

Determining Card-Issuer Interchange-Fee Savings

This section continues the above example in the context of credit-card transaction data being made available to interchange module 116 to determine a savings between an adjusted baseline interchange rate and a current rate. This data is made available following its being provided in FIG. 2, only in this section the interchange module determines a current rate rather than a baseline rate.

Figure 4:
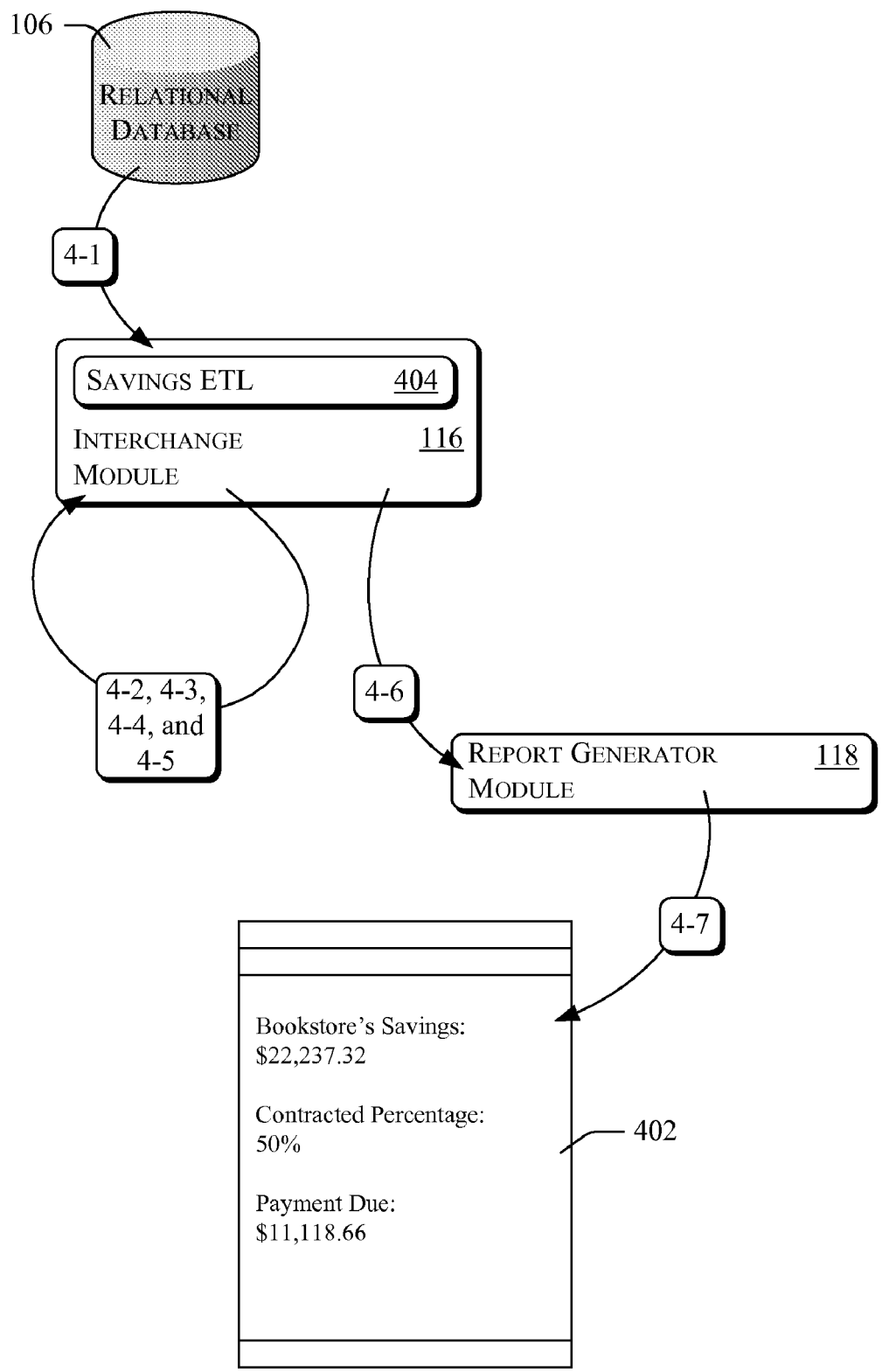
FIG. 4 illustrates an example flow diagram in which the tools determine a savings between an adjusted baseline interchange rate and a current rate.

At arrow 4-1 in FIG. 4, interchange module 116 extracts card-issuer interchange fees and dollar volumes on which the fees were assessed for all of the bookstore's 2,000 merchants over a current billing cycle. The interchange module uses each merchant's identifier (e.g., "932734932") and each billing cycle's end date (e.g., Apr. 30, 2007) to find this information in relational database 106. Consider a portion of a merchant-processor statement for the current billing period and for the same merchant described in FIGS. 2 and 3 above.

| FEES NUMBER | AMOUNT | DESCRIPTION | TOTAL |
|---|---|---|---|
| | | SUPPORT PACKAGE | 5.95 |
| 02 | 14.00 | TERMINAL FEE | 28.00 |
| 04 | 80.11 | VISA ® STANDARD (2.63% × SALES + $.10 × ITEMS) | 2.50 |
| | | . . . | |
| 297 | | DISCOVER AUTHORIZATIONS @ 15 CENTS | 44.55 |
| | | OTHER FEES DUE | 1,991.20 |
| | | DISCOUNT DUE | 304.23 |
| | | OTHER FEES DUE | 1,991.20 |

At arrow 4-2, the interchange module adds up all the fees and dollar volumes on which interchange fees are charged for each merchant over the current billing cycle. Here the "Discover Authorization" fees and the terminal fees are excluded, as they are not an amount on which a card-issuer interchange fee is charged.

Thus, interchange fees for the particular merchant during the current billing cycle are:

Interchange Fees=$1,991.20−28.00−44.55=$1,918.65

The interchange module does this again for every merchant. By so doing, the interchange module determines the client's total fees and dollar volume on which the interchange fees were based for the current billing cycle.

At arrow 4-3, the interchange module divides the total interchange fees by this dollar volume to provide a current card-issuer interchange rate for the current billing cycle for the bookstore. For the particular merchant above, assume that the interchange dollar volume is $148,411.43. Thus, the current card-issuer interchange rate is:

Merchant's Current Rate=$1,918.65/$148,411.43=1.29%

For the bookstore, assume that the current total interchange fees are $598,000 and total dollar volume on which these fees were charged is $31,000,000. The bookstore's current card-issuer interchange rate is:

Bookstore's Current Rate=$598,000/$31,000,000=1.93%

At arrow 4-4, the interchange module determines a rate difference between the bookstore's current rate and the bookstore's adjusted baseline card-issuer interchange rate by subtracting the current rate from the adjusted rate. The bookstore's rate difference is:

Bookstore's Rate Difference=2.00173333%−1.93%=0.0717333%

At arrow 4-5, the interchange module determines the interchange fee savings by multiplying the bookstore's rate difference by its dollar volume on which interchange fees were applied. The savings are:

Bookstore's Savings=$31,000,000×0.0717333%=$22,237.32

At arrow 4-6, the interchange module provides the bookstore's savings to report generator module 118. The report generator module receives the savings and generates a report that is human readable, shown at arrow 4-7 and with report 402. This report may be a window on a computer screen (e.g., a graphical user interface) or a PDF file for reading on a computer screen or printing and viewing on paper. This report generator may also, in conjunction with the interchange module or independently, multiply the savings by a particular percentage, such as one contractually agreed-on by the client (e.g., the bookstore) and the user of the interchange module to assess a payment for services rendered in reducing interchange fees.

The interchange module performs the actions of arrows 4-1 to 4-5 using a savings ETL package 404, shown included in the interchange module in FIG. 4. The act of extracting card-issuer interchange fees and dollar volumes of arrow 4-1 is performed by an Extract portion of an ETL process caused by the computing device executing the savings ETL package. The acts of adding up all the fees and dollar volumes, dividing the total interchange fees by this dollar volume, subtracting the current rate from the adjusted rate, and multiplying the bookstore's rate difference by its dollar volume on which interchange fees were applied, at arrows 4-2, 4-3, 4-4, and 4-5, respectively, are performed by a Transform portion of this ETL process. The saving ETL package also provides the bookstore's savings to the report generator module as described at arrow 4-6 using a Load portion of the ETL process.

Auditing Interchange Categories

This section sets forth one example way in which the tools audit interchange categories assigned to credit-card transactions. It continues the example of the bookstore, but may be separate from or integral with the Building and Adjusting Baseline Interchange Rates and Determining Card-Issuer Interchange-Fee Savings sections.

In this example, interchange module 116 determines, automatically and without user interaction, whether interchange categories assigned to a merchant's credit-card transactions are correct. The interchange module, in conjunction with other elements of exemplary embodiment 100, can determine whether hundreds of thousands of credit-card transactions or groups of transactions were assigned a correct interchange category.

Figure 5:
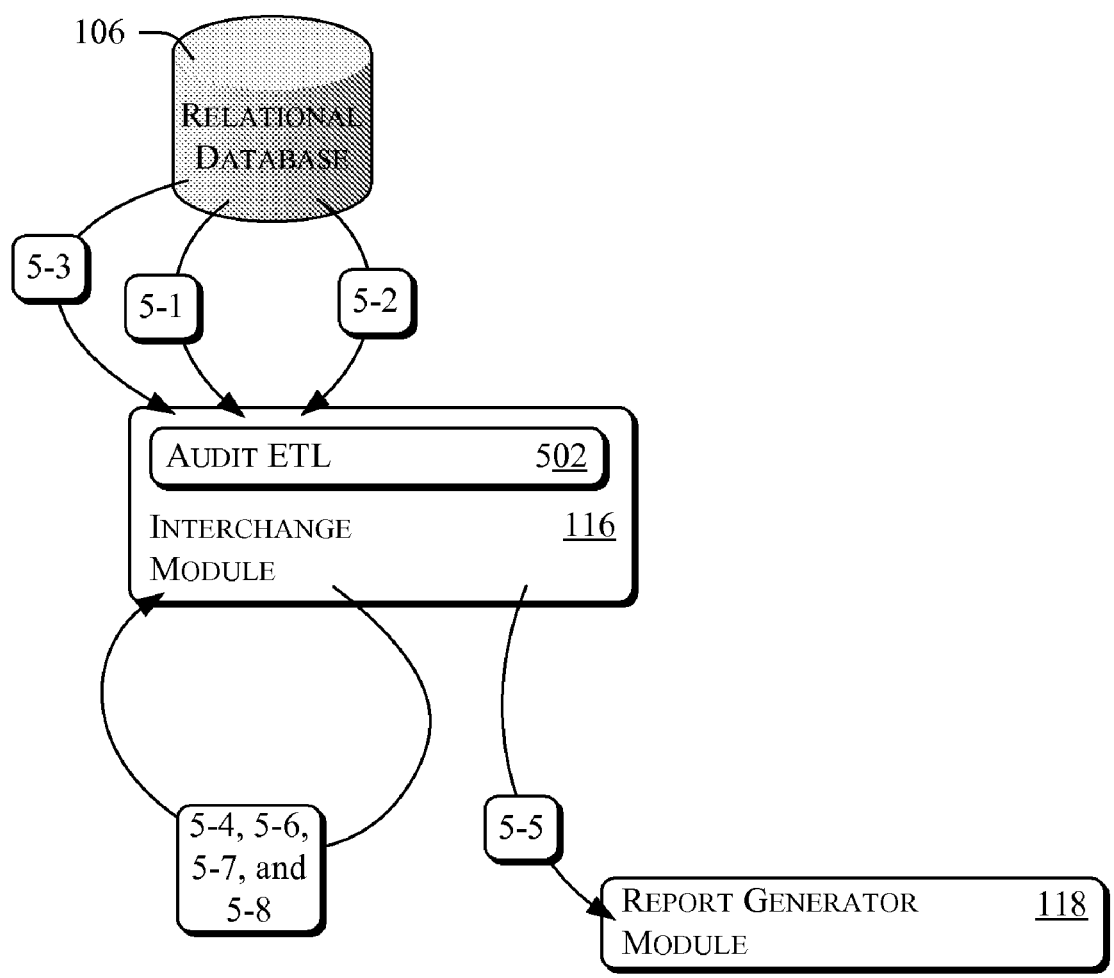
FIG. 5 illustrates an example flow diagram in which the tools audit interchange categories assigned to credit-card transactions.

Turning to FIG. 5, at arrow 5-1 the interchange module receives published interchange-category parameters for each of the interchange categories assigned to a particular merchant and to which credit-card transactions were assigned or may potentially be correctly assigned. These parameters may change over time, so the interchange module receives parameters used for a particular billing cycle in which the credit-card transactions were transacted or batched. These published parameters include, by way of example, the following merchant-status interchange parameters: business sector; area of operation; and taxable or non-taxable status. A (fictitious) VISA® Education interchange category, for example, may include a published interchange-category parameter requiring that the merchant receiving the credit-card transaction be in an education business section and have a non-taxable status.

These published interchange-category parameters are published by the card issuer of that interchange category, such as VISA® or MasterCard®. They may be published on a website, made available through APIs, or distributed to interested parties in electronic or paper form. In any case, these published interchange-category parameters are entered into relational database by data-entry entity 104 in any of the manners described above for entering data (not shown in FIG. 5).

At arrow 5-2, the interchange module receives a merchant's interchange-category parameters. Continuing the bookstore example, assume that the interchange module receives interchange-category parameters for all of the bookstore's merchants and that one of its merchants is in an education business section but has a taxable status (e.g., a for-profit text-book store owned by the national bookstore chain). These parameters are received by the interchange module from the relational database after being stored in the database by data-entry entity 104 either manually or electronically.

At arrow 5-3, the interchange module receives credit-card transaction data indicating groups of credit-card transactions and their assigned interchange categories. Assume that the merchant at issue is the for-profit text-book store owned by the national bookstore chain.

Consider the following groups of transactions and their assigned interchange categories for this text-book store:

| FEES NUMBER | AMOUNT | DESCRIPTION | TOTAL |
|---|---|---|---|
| | | SUPPORT PACKAGE | 5.95 |
| 02 | 14.00 | TERMINAL FEE | 28.00 |
| 10 | 586.95 | VISA ® STANDARD (2.63% × SALES + $.10 × ITEMS) | 16.44 |
| 350 | 12,452.24 | VISA ® RTL CK DB (1.05% × SALES + $.15 × ITEMS) | 183.25 |
| 461 | 27,404.65 | VISA ® CPS RETAIL (1.54% × SALES + $.10 × ITEMS) | 468.13 |
| 57 | 3,431.71 | VISA ® EDUCATION (2.14% × SALES + $.10 × ITEMS) | 79.14 |
| 16- | 662.12- | VISA ® CREDIT CONSUMER CARD @ 1.67% | 11.06- |
| 01- | 6.37- | VISA ® CREDIT COMMERCIAL CARD @ 2.24% | .14- |
| 47 | 1,716.92 | VISA ® EIRF DB (1.75% × SALES + $.20 × ITEMS) | 39.45 |
| 02 | 92.90 | VISA ® STANDARD DB (1.90% × SALES + $.25 × ITEMS) | 2.27 |
| 09- | 257.19- | VISA ® CV-CNSR DB (1.31% × SALES) | 3.37- |
| | 52,203.43 | VISA ® DUES AND ASSESSMENTS (.0925% × SALES) | 48.29 |
| 10 | 1,577.69 | MC STANDARD (2.70% × SALES + $.10 × ITEMS) | 43.60 |

-continued

| FEES NUMBER | AMOUNT | DESCRIPTION | TOTAL |
|---|---|---|---|
| 522 | 32,284.36 | MC MERIT 3 (1.54% × SALES + $.10 × ITEMS) | 549.38 |
| 06 | 1,579.45 | MC KEY ENTERED (1.90% × SALES + $.10 × ITEMS) | 30.61 |
| 81 | 3,821.95 | MC CORP DATA RT1 (2.65% × SALES + $.10 × ITEMS) | 109.38 |
| 16 | 604.03 | MC STANDARD DB (1.90% × SALES + $.25 × ITEMS) | 15.48 |
| 10 | 203.57 | MC KEY ENTER DB (1.64% × SALES + $.16 × ITEMS) | 4.94 |
| 929 | 37,417.09 | MC MERIT 3 DB (1.05% × SALES + $.15 × ITEMS) | 532.23 |
| 19- | 371.74- | MC CONS DB RF 3 @1.40% | 5.20- |
| 19- | 668.64- | MC CONS CR RF 4 @1.77% | 11.83- |
| 02- | 139.68- | MC CORP CR RF 3 @2.15% | 3.00- |
|  | 77,488.14 | MC DUES AND ASSESSMENTS (.095% × SALES) | 73.61 |
| 65 | 6,311.88 | VISA ® BUS ELECT (2.20% × SALES + $.10 × ITEMS) | 145.36 |
| 05 | 206.18 | VISA ® BUS STD (2.70% × SALES + $.10 × ITEMS) | 6.07 |
| 296 |  | DISCOVER AUTHORIZATIONS @ 15 CENTS | 44.40 |
|  |  | OTHER FEES DUE | 2,391.38 |

Note the bolded group of credit-card transactions and their category: VISA® Education (provided for example purposes—not a currently-used category). As noted above, this category requires that the merchant receiving the credit-card transaction be non-taxable and in the education business sector.

At this point the interchange module has the following information: the published interchange-category parameters for VISA® Education; the interchange-category parameters for the text-book store; and that a group of transactions have been assigned this VISA® Education category. The interchange module also has credit-card transaction data about this group of transactions: the number of transactions; amount of the transactions; and amount of the interchange fee charged.

At arrow 5-4, the interchange module determines whether or not the interchange categories assigned to all transactions and for all of the client's merchants during a billing cycle are correct. Continuing this example, the interchange module compares the interchange-category parameters for the text-book store with those required for the VISA® Education interchange category. The VISA® Education interchange category requires that the merchant have a non-taxable status. Here the text-book store is for-profit and so has a taxable status. Thus, the interchange module determines that the group of transactions assigned the VISA® Education interchange category were incorrectly assigned this category.

For each transaction or group of transactions that are correctly assigned, the interchange module records this finding in the relational database. For each transaction or group of transactions that are not correctly assigned, the interchange module can proceed to indicate this finding and the other pertinent information (the merchant, the reason the assigned category was incorrect, and credit-card transaction data about the transaction(s)) to report generator module 118 at arrow 5-5, or continue first to 5-6 to compute a savings or loss.

At arrow 5-6, the interchange module determines the correct interchange category based on comparing published interchange-category parameters for various interchange categories with the interchange-category parameters for the merchant.

For the VISA® Education group of transactions the interchange module determines that VISA® EIRF DB is correct because VISA® EIRF DB applies to merchants with a taxable status with an education business section (and others), and because the transactions were handled in a particular manner (i.e., following EIRF DB's requirements).

At arrow 5-7, the interchange module determines the correct interchange-category fee that should have been charged.

Here EIRF DB should have been applied instead of Education. VISA® Education's fee is 2.14% times the amount plus $0.10 per transaction, with a charged fee of $79.14. The interchange module determines the correct fee, which for VISA® EIRF DB is:

VISA® EIRF DB=1.75%×Sales+$0.20×Items

For the group at issue, this computes to:

VISA® EIRF DB=1.75%×$3,431.71+$0.20× 57=$60.05+$11.40=$71.45

At arrow 5-8, the interchange module determines the savings or loss, here:

Savings=$79.14−$71.45=$7.69

Following arrow 5-8, the interchange module sends this savings information to the report-generator module according to arrow 5-5.

The interchange module performs the actions of arrows 5-1 to 5-8 using an Audit ETL package 502, shown included in the interchange module in FIG. 5. The acts of arrows 5-1, 5-2, and 5-3 by an Extract portion, the acts of arrows 5-4, 5-6, 5-7, and 5-8 by a Transform portion, and the act of arrow 5-5 by a Load portion of an ETL process caused by the computing device executing the Audit ETL package.

Other Embodiments of the Tools

Figure 6:
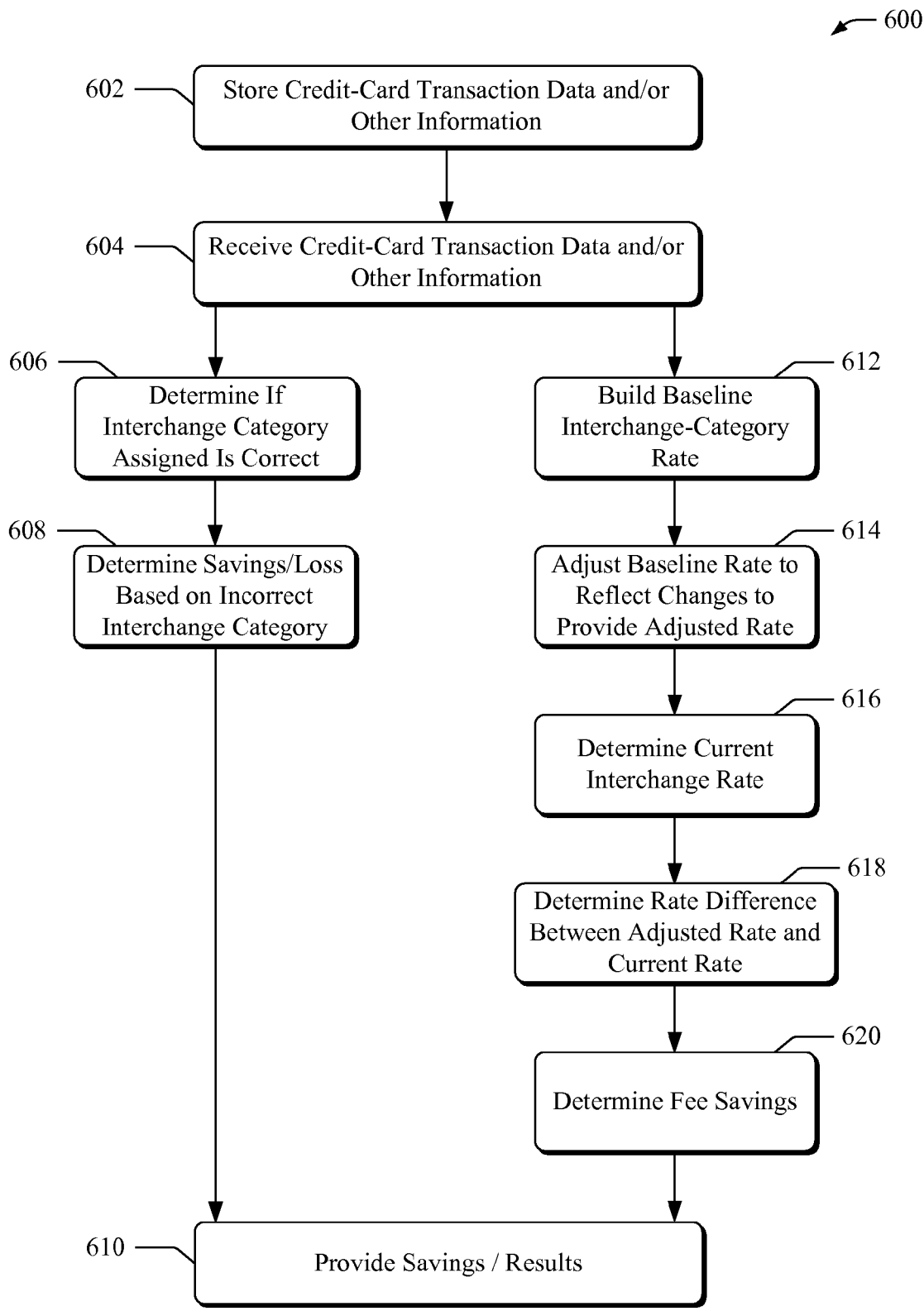
FIG. 6 illustrates an example process illustrating some ways in which the tools may act to audit and/or track fee reductions for interchange fees and their categories, as well as other actions.

The above sections describe particular examples where the tools audit and find savings for a national bookstore chain. In this section other embodiments of the tools are described using process 600 of FIG. 6.

This process and the example processes and flow diagrams described or illustrated in FIGS. 2 through 5 may be implemented in any suitable hardware, software, firmware, or combination thereof; in the case of software and firmware, these processes represent sets of operations implemented as computer-executable instructions stored in computer-readable media and executable by one or more processors (e.g., processor(s) 110 and computer-readable media 112). These embodiments of the tools described in this section are not intended to limit the scope of the tools or the claims.

Block 602 stores credit-card transaction data and other information, such as interchange categories and their published parameters. This information may be stored into a rational database in one or more textual, human-readable formats or in one easily-machine-usable format. In cases were it is stored in more than one format or in a less-desired format, it may be transformed into a format designed for consumption by the tools, such as interchange module 116. The stored credit-card transaction data may include any information made available through a merchant-processor statement or made available by a merchant processor, including individual transactions. Examples of this act of storing and various types of information and credit-card transaction data, as well as an example of transforming formats, are set forth above.

Block 604 receives credit-card transaction data from a rational database for credit-card transactions accepted through one or more merchants and/or other information. Each of these merchants may be identified by its own merchant identifier. As noted above, the data may be received by retrieving the credit-card transaction data using an Extract portion of an Extract, Transform, and Load (ETL) process. This credit-card transaction data and other information may be received periodically, such as each calendar month for billing cycles, or historical, such as to build a baseline interchange rate as described above.

The information received may be for multiple merchants, each of the merchants having received customer purchases during a same time period, such as a particular billing cycle, or having batched their respective customer purchases during this period. The merchants can be associated with a single client or otherwise. If associated with a single client (e.g., the 2,000 merchants of the national bookstore chain), each may be associated based on its merchant identifier and a list of merchant identifiers for that single client.

Block 604 may receive the information based on its merchant identifier, such as all information from merchant-processor statements having a particular merchant identifier. Thus, the tools may receive, automatically, without user interaction, from a relational database, and using the merchant identifiers, credit-card transaction data for credit-card purchases for all merchants of a particular client.

Block 604 may also receive published, merchant-status, and transaction-status interchange parameters. Here the published interchange parameters may be for each of interchange categories assigned and each other type of interchange category to which each of the credit-card transactions of a merchant may potentially be correctly assigned. Examples of these interchange parameters are set forth above. The published interchange parameters may also be non-merchant specific—instead being based on the parameters of the transaction itself. These transaction-status parameters may include whether or not the credit card was present at the time of purchase, whether a merchant entered in a ZIP code or taxable status of the purchaser, whether the purchase was over the internet or phone, whether or not a signature is included with the transaction, and whether or not the credit card was a business card, to name a few.

After receiving the information at block 604, the tools may proceed to audit interchange categories assigned or calculate savings since an historical period or both. The discussion turns first to auditing interchange categories (starting at block 606) and then to calculating savings (starting at block 612).

Block 606 determines if an interchange category assigned to a particular transaction or group of transactions is correct. Block 606 may do so for groups of transactions based on information in a merchant-processor statement or otherwise made available, such as described in the bookstore example above.

Block 606 may also do so for individual transactions. Determining correct interchange categories for individual transactions may be performed like groups above, but doing so for individual transactions permits greater analysis because each transaction may or may not be correctly assigned based not just on a merchant's status, but also the specifics of a transaction.

For example, if a particular transaction is assigned a Card Not Present type of interchange category and the tools have information about that particular transaction, the tools may determine, based on transaction-status parameters for the transaction, such as the credit card actually being present at the time of the transaction, that it was incorrectly assigned.

In some embodiments, block 606 may be performed using an Extract portion of an Extract, Transform, and Load process, such as described above (e.g., ETL 206 of FIG. 2).

Following block 606, the tools may proceed to indicate its findings or proceed to determine a savings or loss based on the incorrect assignment at block 608. In either case block 610 provides results of the tools' determination, here that one or more transactions have been assigned an incorrect card-issuer interchange category.

Block 608, responsive to the tools determining that an interchange category was incorrectly assigned to a transaction or group of transactions, determines a savings or loss between the incorrectly assigned interchange-category's rate and the correct interchange-category's rate. The tools may do so by calculating a correct fee for the applicable transaction at the correct rate and subtracting the incorrect fee. The tools may provide this information to block 610 to report.

The tools may also calculate savings based on reduced interchange-category rates at blocks 612 to 620. Starting with block 612, the tools build a baseline card-issuer interchange rate for a merchant or group of merchants. Block 612 may do so by receiving credit-card transaction data for multiple historical billing cycles and for each merchant of a group of merchants, such as those associated with a particular client. The tools may base this baseline rate on card-issuer interchange fees associated with card-issuer interchange categories assigned to credit-card transactions and dollar volumes on which the card-issuer interchange fees are charged. The card-issuer interchange fees and dollar volumes can be received from multiple historic merchant-processor statements of the particular merchant and over a historical period.

In the bookstore example above, the tools, through interchange module 116, extract card-issuer interchange fees and the dollar volumes from credit-card transaction data in a relational database and transform the card-issuer interchange fees and the dollar volumes into the baseline card-issuer interchange rate by dividing the card-issuer interchange fees by the dollar volumes. In some examples described above, the interchange module performed these acts automatically using an ETL process.

With the baseline determined, block 614 adjusts the baseline card-issuer interchange rate based on rate changes. Block 614 adjusts the baseline rate based on rate changes made during or after the historical period to the card-issuer interchange categories assigned to credit-card transactions of the particular merchant over the historical period.

In more detail, the tools may receive a rate change to the particular card-issuer interchange category for the group of credit-card transactions assigned to that category, determine a fee change based on the dollar volume of the group and the rate change, receive or determine a total interchange fee charged during the historical period based on a total dollar volume and the baseline card-issuer interchange rate, and add or subtract the fee change for the group from the total interchange fee charged during the historical period. By so doing the tools provide an adjusted baseline interchange fee, which the tools divide by the total dollar volume to determine an adjusted baseline interchange rate.

In the bookstore example, for instance, the tools adjusted the baseline interchange-category rate based on an interchange-category's rate changing from 1.54% and $0.10 per transaction to 1.55% and $0.11 per transaction.

With the adjusted baseline interchange-category rate available, the tools proceed to block 616. Block 616 determines a current card-issuer interchange rate for a current billing cycle. The tools may do so by calculating a card-issuer interchange fee for each of the merchants and the dollar volume of credit-card purchases for all of the merchants and on which the card-issuer interchange fees charged are assessed. Dividing the total fee for all merchants by this dollar volume results in a current interchange rate averaged over all the merchants.

The tools then determine a rate difference between the adjusted baseline and the current rate at block 618. Block 618 may determine this difference automatically by subtracting one from the other.

Block 620 determines a fee savings based on the rate change (if any). The tools may determine this savings, automatically and without user interaction, based on a credit-card dollar volume for the credit-card transactions during the current billing cycle and the determined rate difference.

Responsive to determining a fee savings at block 620 and/or a fee savings based on an incorrectly assigned interchange category at block 608, the tools provide these fee savings at block 610. Block 610 also provides other information and/or performs some calculations. In one case the tools provide a report, in a human-readable format, showing which of the credit-card transactions to which an interchange category assigned were not correct and an associated fee savings or loss. In another case the tools provide a report to a particular client setting out various fee savings or net savings and a contractually agreed-on percentage of the fees due.

Each of the above acts involving receiving or retrieving information of any sort, a calculation (e.g., add, divide, subtract), or enabling the tools to provide results may be performed automatically and without user interaction, such as through execution of one or more ETL packages. Example ETL packages are described as part of the bookstore example above. The tools, through these ETL packages or otherwise, may provide reports to users that compile savings over hundreds of thousands of credit-card transactions.

CONCLUSION

The above-described tools are capable of auditing and/or determining reductions to card-issuer interchange fees charged for credit-card transactions. The tools may do so automatically and with user interaction for thousands or even millions of transactions. By so doing, the tools may permit merchants to track and reduce their interchange-category fees without needing extensive manpower or expertise. Although the tools have been described in language specific to structural features and/or methodological acts, it is to be understood that the tools defined in the appended claims are not necessarily limited to the specific features or acts described. Rather, the specific features and acts are disclosed as example forms of implementing the tools.

The invention claimed is:

1. At least one computer-readable storage media device having computer-readable instructions therein that, when executed by a computing device, cause the computing device to perform acts comprising:
    receiving a plurality of merchant identifiers for a plurality of merchants, each of the merchant identifiers identifying a merchant of the plurality of merchants and at least some of the merchant identifiers being associated with different merchants of the plurality of merchants, each of the plurality of merchants receiving credit-card purchases;
    batching the credit card purchases for the plurality of merchants, the plurality of merchants being associated with a client via each of their respective merchant identifiers;
    retrieving, automatically, without user interaction, from a relational database, and using the merchant identifiers, credit-card transaction data for the credit-card purchases for the plurality of merchants, the credit-card transaction data indicating card-issuer interchange fees charged to each merchant of the plurality of merchants and a dollar volume of credit-card purchases on which the card-issuer interchange fees charged are assessed for each merchant of the plurality of merchants;
    calculating a first card-issuer interchange rate that the client was charged based on the card-issuer interchange fees charged to each merchant of the plurality of merchants, or the card-issuer interchange fees charged to each merchant of the plurality of merchants and the dollar volume of credit-card purchases on which the card-issuer interchange fees charged are assessed for each merchant of the plurality of merchants, respectively;
    determining whether or not an interchange category assigned for one or more of the credit-card purchases is correct by:
        receiving published interchange categories and published interchange parameters for the published interchange categories, the published interchange categories and the published interchange parameters being for a time-period at which the one or more of the credit-card purchases were transacted or batched;
        determining transaction status parameters that were used to assign the one or more of the credit card purchases to an assigned interchange category;
        matching the transaction status parameters to corresponding published interchange category parameters;
        determining one of the published interchange categories that includes the corresponding published interchange parameters; and
        determining that the one of the published interchange categories does not match the assigned interchange category;
    calculating for the one or more of the credit card purchases a second card-issuer interchange rate that the client would have been charged if a correct interchange category had been assigned to the one or more of the credit card purchases; and
    determining, for respective credit card purchases of the one or more of the credit card purchases, a savings or loss between the first card-issuer interchange rate and the second card-issuer interchange rate.

2. The at least one storage media device of claim 1, wherein the act of retrieving the credit-card transaction data retrieves the credit-card transaction data using an Extract portion of an Extract, Transform, and Load (ETL) process, the act of calculating uses a Transform portion of the ETL process, and the act of providing uses a Load portion of the ETL process.

3. The at least one storage media device of claim 1, wherein the credit-card transaction data comprises information about each of the credit-card purchases received by the plurality of merchants.

4. The at least one storage media device of claim 1, wherein the credit-card purchases are transacted with branded credit cards and processed through one or more credit card networks associated with the branded credit cards.

\* \* \* \* \*